(12) United States Patent
Gooch et al.

(10) Patent No.: US 6,249,007 B1
(45) Date of Patent: Jun. 19, 2001

(54) NON-CONTACT DISTANCE MEASURING APPARATUS

(75) Inventors: Richard Michael Gooch, Bristol; Timothy Alan Clarke, Herts, both of (GB); Grant Andrew Ockleston, Auckland (NZ); Clive Hatch, Hamps (GB)

(73) Assignee: Thames Water Utilities Limited, Reading (GB)

( * ) Notice: Subject to any disclaimer, the term of this patent is extended or adjusted under 35 U.S.C. 154(b) by 0 days.

(21) Appl. No.: 09/151,268

(22) Filed: Sep. 11, 1998

(30) Foreign Application Priority Data

Sep. 12, 1997 (GB) .................................................. 9719514

(51) Int. Cl.⁷ .................................................. G01B 11/00
(52) U.S. Cl. ................. 250/559.31; 356/376; 250/559.29
(58) Field of Search ........................ 250/559.05, 559.06, 250/559.08, 559.07, 559.19, 559.22, 559.23, 559.24, 559.29, 559.3, 559.31, 559.33, 559.38; 356/3.01, 3.06, 3.07, 4.01, 376, 377, 378, 379, 380, 384, 387

(56) References Cited

U.S. PATENT DOCUMENTS

| | | | |
|---|---|---|---|
| 4,040,738 | 8/1977 | Wagner. | |
| 4,322,627 | * 3/1982 | Pirlet | 250/559.23 |
| 4,373,804 | * 2/1983 | Pryor et al. | 356/3.07 |
| 4,419,011 | * 12/1983 | Matsuda et al. | 356/3.06 |
| 4,820,041 | * 4/1989 | Davidson et al. | 356/3.12 |
| 4,937,460 | 6/1990 | Duncan et al. . | |

FOREIGN PATENT DOCUMENTS

| | | |
|---|---|---|
| 4206608 | 9/1993 | (DE) . |
| 4415582 | 11/1995 | (DE) . |
| 0 278 269 A2 | 8/1988 | (EP) . |
| 0 455 305 A1 | 11/1991 | (EP) . |
| 0 872 708 A2 | 10/1998 | (EP) . |
| 1 234 427 | 11/1968 | (GB) . |
| 2 083 313 | 3/1982 | (GB) . |
| 2 238 115 | 5/1991 | (GB) . |
| 61-134611 | 6/1986 | (JP) . |
| WO 86/07444 | 12/1986 | (WO) . |
| WO 88/02713 | 4/1988 | (WO) . |

* cited by examiner

*Primary Examiner*—John R. Lee
(74) *Attorney, Agent, or Firm*—McDermott, Will & Emery

(57) ABSTRACT

The invention relates to a non-contact distance measuring apparatus, comprising a casing, a distance measuring means located within the casing for measuring the distance between the distance measuring means and an object using electromagnetic radiation, and the casing being substantially transparent to the electromagnetic radiation used by the distance measuring means.

8 Claims, 1 Drawing Sheet

NON-CONTACT DISTANCE MEASURING APPARATUS

BACKGROUND OF THE INVENTIONS
TECHNICAL FIELD

The present invention relates to a non-contact measuring apparatus, and more particularly, but not exclusively, to a non-contact measuring apparatus for determining the profile or cross-section of an object. For example, the apparatus can determine the internal cross section of an underground pipe, such as a sewage pipe, or any other hollow object.

DESCRIPTION OF THE RELATED ART

In many industries the measurement of cross-sections is necessary for a variety of purposes such as monitoring the deformation of a structure, assessing the condition of a structure, measuring the thickness of a coating and construction of three-dimensional computer aided design (CAD) models.

One method conventionally employed for such purposes is single point optical triangulation. In such a system a laser beam is directed to the object and a sensor measures the position of the image of the beam formed by a lens. The position of the reflected laser beam on the sensor gives an indication of the distance of the object from the measuring apparatus. In one known arrangement the laser and the sensor are mounted for rotation so that the distance of the object can be measured at a plurality of locations in order to collect data indicating the profile or internal cross-section of the object.

One problem with such conventional apparatus is that, when the internal cross-section of a hollow object is measured, parts are moved within the environment of the inside of the hollow object. This renders the measuring apparatus unsuitable for use in explosive environments, or in situations where the object may contain fluid.

SUMMARY OF THE INVENTION

According to a first aspect of the present invention, there is provided a non-contact distance measuring apparatus, comprising a casing, and distance measuring means located within the casing for measuring the distance between the distance measuring means and an object using electromagnetic radiation, the casing being substantially transparent to the electromagnetic radiation used by the distance measuring means.

Moving means for moving the distance measuring means relative to the casing to measure the distance of said object at a plurality of locations may be provided.

The casing allows distance measurements to be made at a plurality of locations without the need for any external moving parts. This may enable the apparatus to be used, for example, in a pipe full of fluid, or in a hazardous environment such as an explosive environment where movement of parts might cause ignition.

Preferably, the distance measuring means located within the casing comprises an optical triangulation device. Optical triangulation devices are well known to those skilled in the art The distance measuring means may comprise an electromagnetic radiation source, radiation from which is directed to the object, and detection means for detecting radiation reflected from the object, the arrangement being such that the distance of the object from the distance measuring means can be determined by detection of the reflected radiation.

The radiation source may comprise a laser.

The detection means may be a charge coupled device (CCD) sensor, and may have an elongate sensitive surface and means for detecting the position on the elongate sensitive surface of the image of the reflected laser beam. The use of a CCD sensor may enable distance measurement to be performed very quickly. The speed may be determined by the number of pixel elements and the integration time of the sensor and can be in the range from substantially 500 Hz to 150 kHz. Preferably, the CCD sensor is calibrated prior to use.

The moving means may be arranged to rotate the distance measuring means within the casing. This provides a convenient way of measuring the distance between the measuring means and the object at a plurality of locations in order that data representative of the profile or cross-section of the object may be acquired.

Conveniently, the casing is provided with means for moving the casing relative to the object. Such a feature may enable cross-sections to be determined at a plurality of locations of the object, thus providing information about the object in three-dimensions. The means for moving the casing relative to the object may comprise wheels driven by an electric motor. The electric motor is conveniently controlled remotely by an operator. This allows the apparatus to perform measurements inside objects which are too small to accommodate a person.

A CCD camera may be mounted in fixed relationship with the casing for providing images of the object to an operator. This may allow the operator to ascertain the position of the apparatus so that the measurement of, for example, a cross-section can be made at the appropriate place.

According to another aspect of the present invention there is provided a hollow body, such as a pipe, cross-section measuring device comprising a movable optical triangulation probe for measuring the distance of the hollow body or pipe at a plurality of locations to determine the profile or cross-section thereof.

The probe may be rotated relative to the hollow body of the pipe to determine the cross-section thereof at a first position, and the probe may also be translatable relative to the hollow body or pipe to determine another cross-section thereof at a second position.

BRIEF DESCRIPTION OF THE DRAWINGS

For a better understanding of the present invention, an embodiment will now be described by way of example, with reference to the accompanying drawings, in which.

DETAILED DESCRIPTION OF THE PREFERRED EMBODIMENTS

Figure 1:
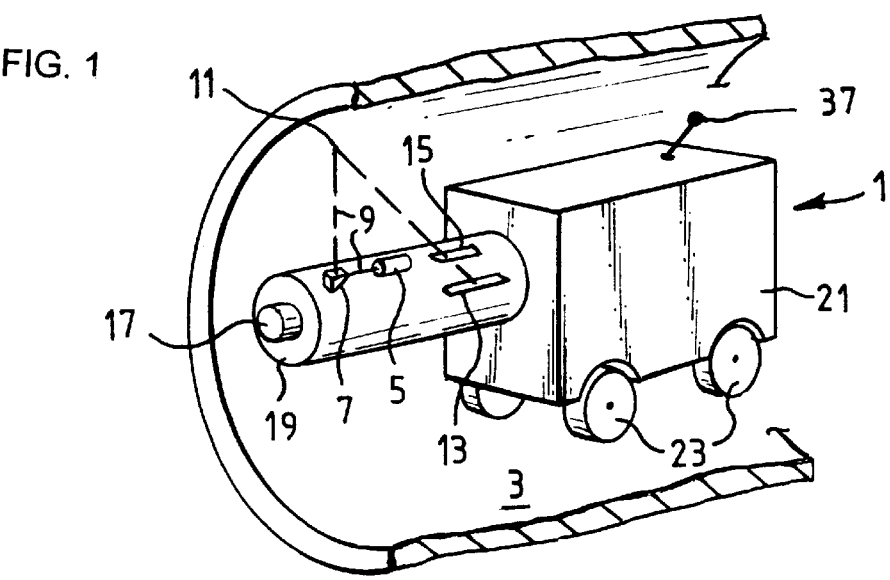
FIG. 1 is a perspective view of the distance measuring apparatus located within a pipe, which pipe is shown partially cut-away.

FIG. 1 shows generally at 1 a non-contact cross-section measuring apparatus within a pipe 3. The apparatus 1 includes a laser 5 and deflector means 7 for directing the beam 9 from the laser 5 towards the internal surface of the pipe 3. The laser beam hits the internal surface of the pipe 3 at point 11 and is reflected back to a sensor 13 via a lens 15. A CCD camera 17 is provided for generating Images of the inside of the pipe 3. All the aforesaid components are located within a cylindrical casing 19 which is transparent to the electromagnetic radiation generated by the laser 5 so that the laser beam 9 can pass through the casing 19.

The laser 5, deflector 7, sensor 13 and lens 15 are all mounted for rotation about the central axis of the cylindrical casing 19. The means for moving these components is not shown in FIG. 1. The CCD camera 17 is fixed relative to the casing 19.

The casing 19 is mounted on main body part 21. The main body part 21 includes means, such as wheels 23 to enable the casing 19 to be moved along the inside of the pipe 3 so that internal cross-sections of the pipe 3 may be measured at various locations along the length of the pipe 3.

Figure 2:
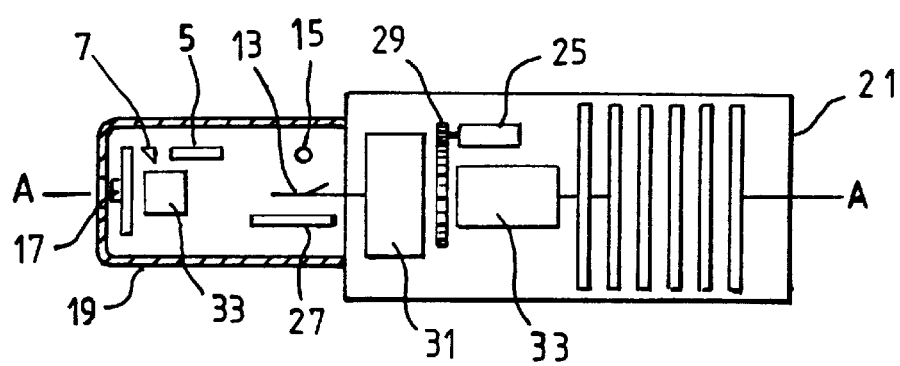
FIG. 2 shows a cross-section through the measuring apparatus of FIG. 1.

FIG. 2 shows a cross-section through the apparatus 1 of FIG. 1, and like elements are designated with the same reference numerals. FIG. 2 shows the location of a motor 25 within the main body part 21 which causes the rotation of the laser 5, deflector 7, lens 15 and sensor 13 (together with associated sensor electronics 27, via gear 29). An optical encoder 31 is provided so that the position of the rotatable components within the casing 19 can be accurately determined. The axis A—A about which the components are rotated is shown in FIG. 2. Slip rings 33 are provided to enable the power to be transmitted to the laser 5, sensor 13 and CCD camera 17, and also enable the output of the sensor 13 and CCD camera 17 to be made available at the non-rotating main body part 21.

The distance between the sensor 13 and the internal wall of the pipe 3 is measured using conventional single point optical triangulation. The beam 9 from the laser 5 is directed to the internal wall of the pipe 3, and reflected from the wall at point 11, as discussed above. The sensor 13 is elongate, as shown in FIG. 1, and, in this embodiment is a CCD sensor. The longest dimension of the sensor 13 is in the direction of axis A—A. The position at which the beam 9, after reflection from the wall of the pipe 3, hits the sensor 13 will vary according to the distance of the wall from the laser 5/deflector 7/sensor 13. The CCD sensor 13 provides an output indicative of the location at which the beam 9 hits its sensitive surface. The change in location of the point at which the beam 9 hits the sensitive surface of sensor 13 varies generally non-linearly which the change in distance of the wall of pipe 3 from the measuring apparatus. To provide an accurate measurement of distance, the apparatus requires calibration to translate raw sensor data into distance information. To achieve the highest accuracy, calibration is required for all distances within the measuring range. Calibration can be provided using a model with appropriate parameters, or by use of a look-up table, both methods being well known to those skilled in the art.

Also, the provision of cylindrical casing 19 makes calibration at each angular position of the triangulation probe advantageous because, if the casing 19 is poorly centred or is not completely circular in cross-section, measurement accuracy will be adversely affected.

The apparatus 1 is controlled remotely. The main body part 21 contains a transmitter/receiver (not shown) which transmits/receives to/from a base station (also not shown) via antenna 37. Data received by the apparatus 1 include instructions to rotate the laser 5/sensor 13 and instructions to move the apparatus 1 within the pipe 3 by means of wheels 23. Data transmitted by the apparatus 1 may include raw data from the sensor 13, image data from the CCD camera 17 and rotation position data generated by optical encoder 31.

In an alternative arrangement, the data is transmitted using a cable between the main body part 21 and the base station.

To measure the internal cross-section of the pipe 3 the apparatus 1 is moved to the appropriate position along the pipe 3 by means of wheels 23. The apparatus 1 then remains stationary until all the information concerning the cross-section of the pipe 3 at that location has been gathered. To gather the information, the laser 5 is energised, and the laser beam 9 therefrom is deflected toward the internal wall of the pipe 3 by deflector 7. The beam 9 reflects from the wall at point 11 back to the sensor 13 via lens 15. The sensitive CCD sensor surface of sensor 13 registers the point where the image of the reflected beam 9 hits, and this data is transmitted to the base station. The laser 5, deflector 7, sensor 13 and lens 15 are then rotated about axis A—A and a further distance measurement is made in the same way, the raw data being transmitted, again, to the base station. This process is repeated until a rotation of 360° occurs so that data concerning the internal surface of the pipe 3 for a given position of the apparatus 1 is collected.

If required, the apparatus 1 can then be moved, using wheels 23 which are driven by an electric motor (not shown), to another position in the pipe 3 and a further set of measurements can be made. This process allows a three-dimensional model of the inside of the pipe 3 to be generated. An instrument (not shown) may be provided to determine the spatial position and orientation of the device in order that the respective sets of measurements can be connected. For example, the instrument may be an inertial guidance gyroscope.

Figure 3:
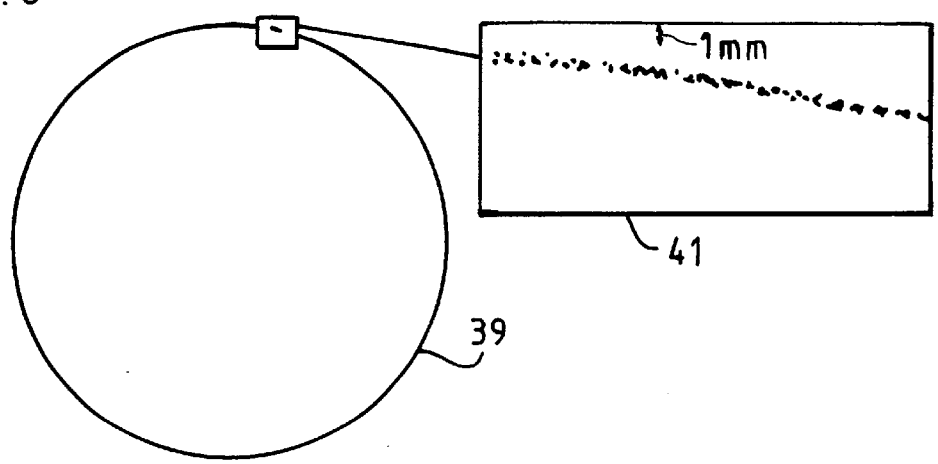
FIG. 3 shows an example of data acquired by the measuring apparatus.

The raw data from sensor 13 is converted into distance measurement information using, for example, a look-up table, as described above, using a computer in a way well known to those skilled in the art. The plurality of distance measurements together with angle measurements provide an indication of the cross-section of the pipe 3. An example of such data is shown in FIG. 3 at 39, and a part of the cross-section is shown in greater detail at 41.

In an alternative arrangement, the raw data is processed and stored at the apparatus 1 prior to being transferred to the base station.

The apparatus 1 is also operable to measure partial cross-sections of objects, and can, of course, measure surface information about objects other than pipes. For example, the apparatus 1 could provide information about the external surface of a solid object.

The laser 5, deflector 7, sensor 13, lens 16 and CCD camera 17 are all housed within transparent (clear) casing 19. This renders the instrument waterproof and allows it to meet the exacting safety regulations of industries operating in hazardous environments. Measurements could be made in a pipe containing liquid, such as a sewer pipe. Also, measurements could be made in a pipe containing explosive gas, the risk of an explosion occurring due to movement of the components being reduced because the components are within casing 19. The arrangement allows distance to be measured without requiring contact and with no external moving parts. Furthermore, because the apparatus 1 is remotely controlled, the apparatus 1 can be used at a considerable distance from the operator so that the operator is not exposed to the hazardous environment where the measurement is taking place.

The range of distance measurement will depend on the accuracy required and the length of the sensitive surface of sensor 13. A typical range for a small pipe measuring instrument would be from 70 mm to 1000 mm, and a device for measuring the profile of a room might have a range of 1 m to 5 m.

The resolution of the device is related to the location precision of the beam 9 image spot on the sensitive surface of sensor 13 and to the non-linear change in angle in the distance of the object. A typical pipe measuring sensor might have an accuracy of 0.025 mm close to the axis A—A and 1.0 mm at the furthest point from the axis A—A. The angular accuracy will generally be matched to the measurement precision.

The speed of distance measurement can be very fast when the sensor is of the CCD type, and is determined by the number of pixel elements and the integration time of the sensor 13, and can range from 500 Hz to 150 kHz. The speed of angular measurement will generally be the sane as for the distance measurement. Of course, technology other than CCD technology could be used for the sensor 13 and/or the camera 17, although CCD technology is particularly advantageous.

The sensor 13 could also be used to collect an image of the pipe 3 by illuminating the pipe 3 and scanning the sensor 13 through 360°.

We claim:

1. A non-contact distance measuring apparatus, comprising:
   (i) a casing:
   (ii) a distance measuring means located within the casing for measuring the distance between the distance measuring means and an object using electromagnetic radiation;
   (iii) the casing being substantially transparent to the electromagnetic radiation used by the distance measuring means; and
   (iv) moving means for moving the distance measuring means relative to the casing to measure the distance of said object a plurality of locations.

2. Apparatus as defined in claim 1, wherein the distance measuring means comprises an optical triangulation device.

3. Apparatus as defined in claim 1, wherein the distance measuring means comprises an electromagnetic radiation source, radiation from which is directed to said object, and wherein there is detection means for detecting radiation reflected from said object, whereby the distance of said object from the distance measuring means can be determined by detection of the reflected radiation.

4. Apparatus as defined in claim 3, wherein said radiation source comprises a laser.

5. Apparatus as defined in claim 3, wherein said detection means comprises a CCD sensor.

6. Apparatus as defined in claim 1, wherein said moving means is arranged to rotate the distance measuring means within the casing.

7. Apparatus as defined in claim 1, wherein said casing is provided with means for moving the casing relative to the object.

8. Apparatus as defined in claim 1, wherein a CCD camera is mounted in a fixed relationship with said casing for providing images of the object to an operator.

* * * * *